(12) United States Patent
Asahi

(10) Patent No.: US 8,952,584 B2
(45) Date of Patent: Feb. 10, 2015

(54) MOTOR

(75) Inventor: Kyohei Asahi, Kyoto (JP)

(73) Assignee: Nidec Corporation, Kyoto (JP)

( * ) Notice: Subject to any disclaimer, the term of this patent is extended or adjusted under 35 U.S.C. 154(b) by 322 days.

(21) Appl. No.: 13/557,244

(22) Filed: Jul. 25, 2012

(65) Prior Publication Data

US 2013/0038153 A1 Feb. 14, 2013

(30) Foreign Application Priority Data

Aug. 9, 2011 (JP) ................................. 2011-173817

(51) Int. Cl.
 *H02K 5/22* (2006.01)
(52) U.S. Cl.
 CPC ...................... *H02K 5/225* (2013.01)
 USPC ............................................................ 310/71
(58) Field of Classification Search
 CPC ....................................................... H02K 5/225
 USPC ............................................................ 310/71
 See application file for complete search history.

(56) References Cited

U.S. PATENT DOCUMENTS

| | | | |
|---|---|---|---|
| 7,193,345 B2 * | 3/2007 | Shinzaki et al. | 310/71 |
| 7,498,702 B2 * | 3/2009 | Migita et al. | 310/71 |
| 7,518,853 B2 * | 4/2009 | Kato et al. | 361/637 |
| 7,560,839 B2 * | 7/2009 | Sumiya et al. | 310/71 |
| 7,884,514 B2 | 2/2011 | Baumgartner et al. | |
| 2009/0015092 A1 * | 1/2009 | Baumgartner et al. | 310/203 |
| 2013/0049915 A1 | 2/2013 | Oki et al. | |

FOREIGN PATENT DOCUMENTS

| | | |
|---|---|---|
| CN | 101796599 A | 8/2010 |
| EP | 2 448 091 A1 | 5/2012 |
| JP | 2005130665 A * | 5/2005 ............... H02K 3/18 |
| JP | 2011-10398 A | 1/2011 |

OTHER PUBLICATIONS

Machine Translation, Aiba et al., JP 2005130665 A, May 19, 2005.*

* cited by examiner

*Primary Examiner* — Quyen Leung
*Assistant Examiner* — Thomas Truong
(74) *Attorney, Agent, or Firm* — Keating & Bennett, LLP

(57) ABSTRACT

An electric motor includes a rotating portion that rotates around a rotational axis and a stationary portion. The rotating portion includes a shaft and a rotor. The stationary portion includes a cover portion, a stator, and a connector including a connection terminal. The connection terminal includes a base portion that extends along a first direction, and a pressing portion that is bent to overlap with the base portion in an axial direction. A conductive line which is drawn from a coil is disposed between the base portion and the pressing portion, and the connection terminal and the conductive line contact each other and are welded in a state of overlapping with each other in an axial direction.

9 Claims, 11 Drawing Sheets

MOTOR

BACKGROUND OF THE INVENTION

1. Field of the Invention

The present invention relates to a motor, and more particularly, to a connection structure between a conductive line which is drawn from a coil and a terminal.

2. Description of the Related Art

U.S. Pat. No. 7,884,514 shows a conventional motor including three terminals. Each terminal includes a U-shaped hook, and a single conductive line which is drawn from a coil group is sequentially wound around the U-shaped hook and is welded. Thereby, each terminal and the conductive line are electrically connected to each other.

In a winding process in which a coil is formed, it is necessary to wind the conductive line around teeth of a stator core without being loose. Thereby, sufficient tension to prevent looseness of the conductive line needs to be applied to the conductive line.

In the case of the motor of U.S. Pat. No. 7,884,514, since the conductive line is wound around a hook of the terminal in the course of the winding process, the tension of the conductive line is also applied to the hook. Accordingly, the hook needs sufficient strength to endure the tension of the conductive line without becoming permanently deformed or broken.

For example, when output efficiency of the motor is improved, it is considered that electric resistance is decreased by increasing the diameter of the conductive line. However, if the diameter of the conductive line is increased, stiffness of the conductive line is also increased in proportion to the increased diameter, and the tension which is applied to the conductive line in the winding process is also increased.

Accordingly, in the case of the conventional motor of U.S. Pat. No. 7,884,514, if the diameter of the conductive line is increased, disadvantages such as the need to strengthen the terminal or limitation of the diameter of the conductive line occur since there is a concern that deformation or damage of the hook may occur.

Moreover, in the case of the conventional motor of U.S. Pat. No. 7,884,514, there is a disadvantage at the time of the connection. Generally, welding between the conductive line and the terminal is performed by so-called fusion welding. In the fusion welding, the conductive line is clamped between terminals by a pair of electrodes, and the conductive line is welded by the pressing force and resistance heating which is generated by applying current between the electrodes.

When the conductive line is wound around the hook, the conductive line tends to strongly contact both corners of the hook. Thereby, when the fusion welding is performed, the resistance heating is unevenly distributed at both corners and there is a concern that the conductive line may be broken because the conductive line is welded too much in both corners. As a result, irregularity in the welding strength occurs, and there is a concern that connection failure or breaking of the wire may occur.

In addition, in the case of the conventional motor of U.S. Pat. No. 7,884,514, there is also a disadvantage after the connection. For example, in the case of an on-vehicle motor or the like used in an environment in which a great vibration is constantly applied, since the conductive line is welded to the terminal in a state where tension is applied, particularly, the welded portion is easily damaged by the action of an external force.

SUMMARY OF THE INVENTION

Preferred embodiments of the present invention provide a connection structure which has improved durability and which is also suitable for an on-vehicle motor.

A motor in accordance with a preferred embodiment of the present invention is an electric motor including a rotational axis, a rotating portion that rotates around the rotational axis, and a stationary portion. The rotating portion preferably includes a shaft that extends along an axial direction and a rotor that is fixed to the shaft and which includes a magnet. The stationary portion preferably includes a cover portion, a stator, and a connector. The stator is preferably fixed to the inside in a radial direction of the cover portion and includes a coil. The connector is preferably disposed further toward the outside in the radial direction than the stator and is defined by at least one connection terminal in which at least a portion extends along a first direction which is a direction separated from the rotational axis. The connection terminal preferably includes a base portion and a pressing portion. The base portion extends along the first direction. The pressing portion is preferably bent in a circumferential direction of the base portion so that a side portion of at least one side among side portions in the circumferential direction overlaps with the base portion in the axial direction. A conductive line which is drawn from the coil is preferably disposed between the base portion and the pressing portion, and the connection terminal and the conductive line preferably contact each other and are welded in a state of overlapping with each other in an axial direction.

According to preferred embodiments of the present invention, tension caused by the connection line is preferably not applied to the connection portion between the terminal and the end of the conductive line. Moreover, since high quality welding can be performed in motors made in accordance with the preferred embodiments of the present invention, motors having improved durability can be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the accompanying drawings. However, the following description is merely illustrative in nature and is not intended to limit the present invention, its applications, or its uses.

Figure 1:
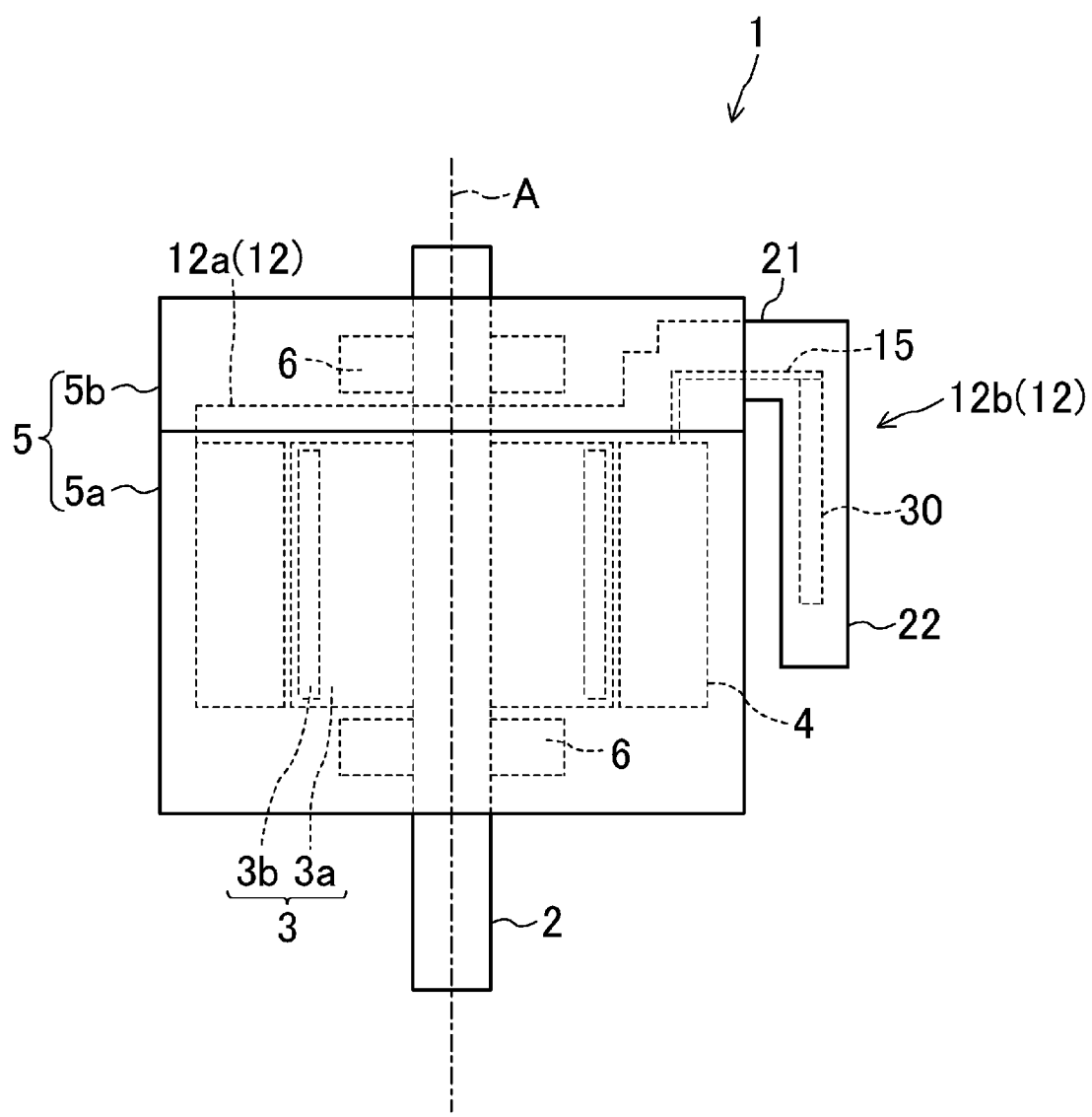
FIG. 1 is a schematic view showing a motor in accordance with a preferred embodiment of the present invention.
Figure 2:
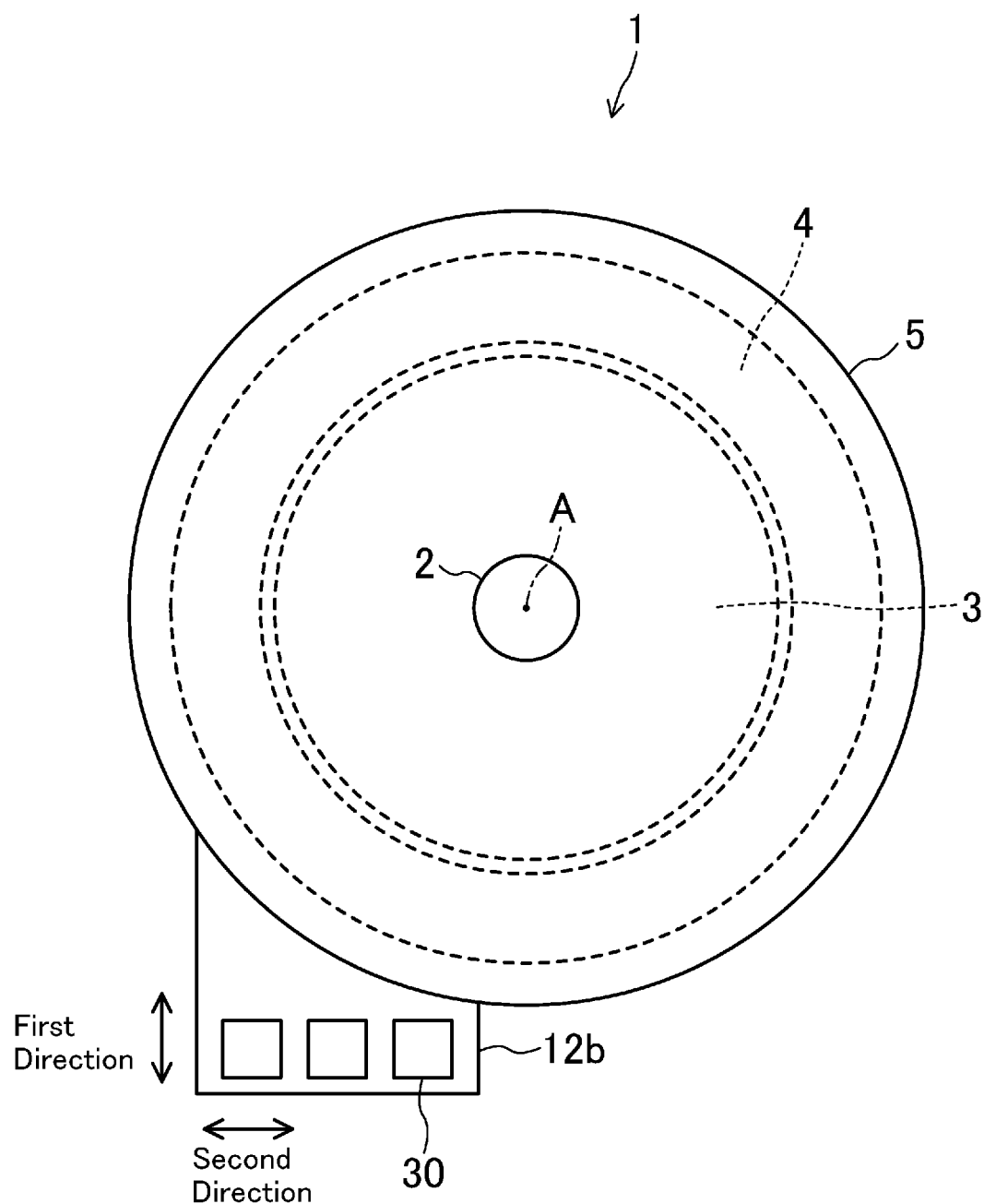
FIG. 2 is a schematic top view of the motor in accordance with a preferred embodiment of the present invention.

FIGS. 1 and 2 show a motor 1 in accordance with a preferred embodiment of the present invention. The motor 1 preferably is an on-vehicle brushless motor, and for example, for use in an oil pump or other suitable application. The motor 1 preferably includes a shaft 2, a rotor 3, a stator 4, a motor case (cover portion) 5, a connector portion 12b, and the like. The shaft 2 and the rotor 3 correspond to a rotating portion, and the stator 4, the motor case 5, and the connector portion 12b correspond to a stationary portion.

The motor case 5 preferably includes a cylindrical case body 5a in which an end is opened and a case cover 5b which closes the opening of the case body 5a. The shaft 2, the rotor 3, and the stator 4 are preferably assembled into an inner portion of the case body 5a which is closed by the case cover 5b.

The shaft 2 preferably is rotatably supported to the motor case 5 through a bearing 6. In FIGS. 1 and 2, a reference character A represents a rotational axis and the shaft 2 rotates about the rotational axis A. In addition, a direction to which the rotational axis A extends is referred to as an axial direction, and a direction which is perpendicular or substantially perpendicular to the rotational axis A is referred to as a radial direction. Moreover, a direction away from and surrounding the rotational axis A is referred to as a circumferential direction.

The rotor 3 is preferably a cylindrical member which includes a rotor core 3a and a plurality of magnets 3b. The magnets 3b are preferably disposed along the circumferential direction at an outer circumferential portion of the rotor 3. The rotor 3 is fixed to the shaft 2 in a state where the center of the rotor 3 coincides with the rotational axis A. Accordingly, the rotor 3 rotates about the rotational axis A along with the shaft 2. The stator 4 is disposed on the outside in the radial direction of the rotor 3 with a slight air gap arranged therebetween.

Figure 3:
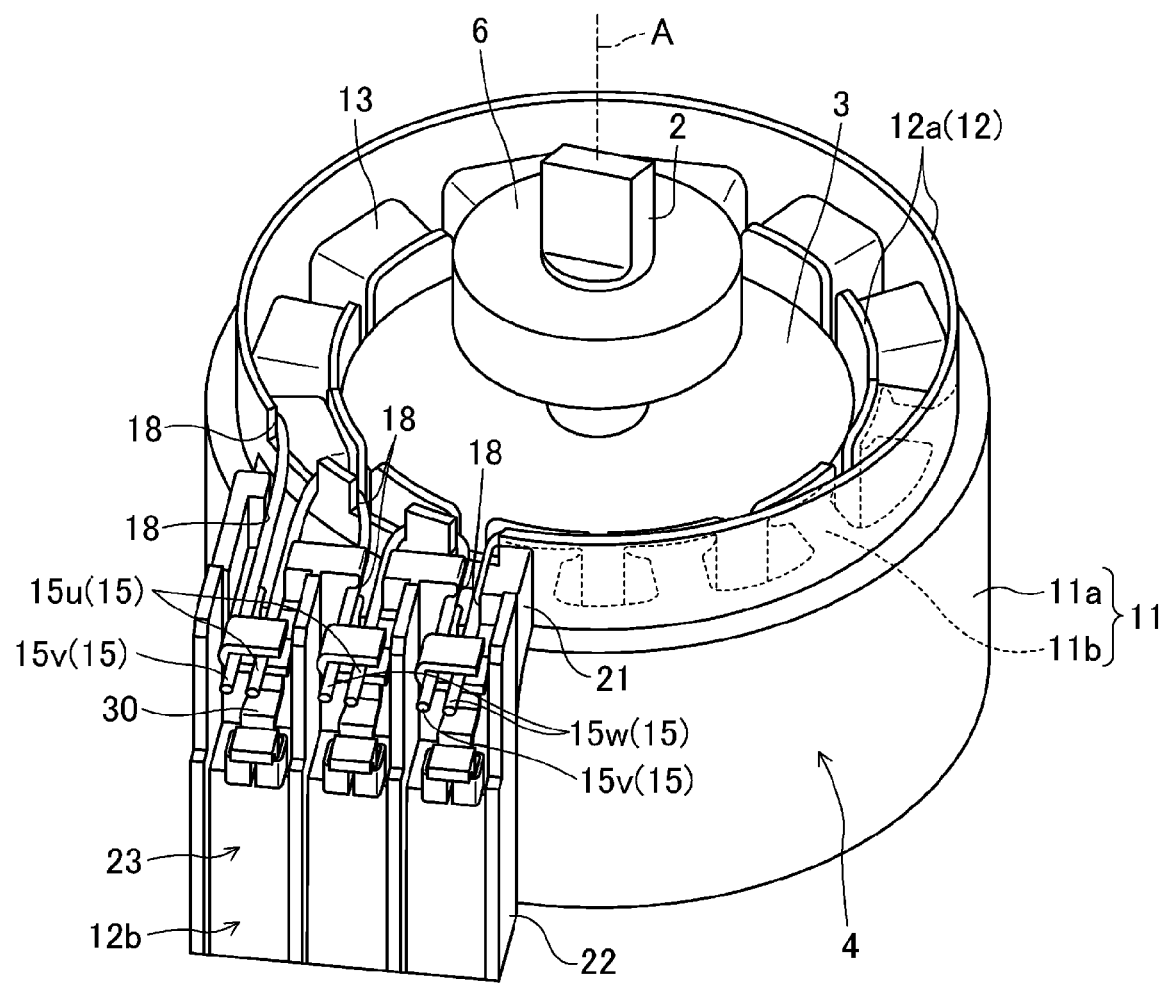
FIG. 3 is a schematic perspective view showing a stator portion in accordance with a preferred embodiment of the present invention.

Also shown in FIG. 3, the stator 4 is preferably a complex member having an approximately cylindrical shape and including a stator core 11, an insulator 12, and a coil 13. The stator 4 is preferably fixed to the inside of the case body 5a. The stator core 11 is preferably defined by laminating a plurality of steel plates, and includes a cylindrical core base 11a and a plurality of teeth 11b which radially extend toward a center in a radial direction from an inner circumferential surface of the core base 11a. The insulator 12 is defined by a member having insulation properties and is mounted to the stator core 11.

The insulation 12 preferably is, for example, an injection-molded product made of resin, and includes a covering portion 12a which covers the stator core 11 and a connector portion 12b which is integrally provided with the covering portion 12a. The conduction line is wound around each tooth 11b through the covering portion 12a such that a plurality of coils 13 are provided. In the case of the motor 1, as a winding method, so-called concentrated winding in which the coil 13 is provided for each tooth 11b is adopted.

The plurality of coils 13 are preferably defined by sequentially winding three conductive lines around a predetermined tooth 11b. Thereby, the coil groups 13, which preferably include a U phase, a V phase, and a W phase, which phases are different from one another, is provided. The coil groups 13 are preferably connected in a so-called delta-connection. By supplying current to three coil groups 13 at a certain period, a magnetic field which is generated in the stator 4 is changed, and the rotator 3 and the shaft 2 will be rotated by this operation.

Both ends 15 of the connective line defining each of coil groups 13 are preferably drawn toward the connection portion 12b side. For example, an end 15u is an end of the conductive line which is drawn from U-phase coil groups 13, an end 15v is an end of the conductive line which is drawn from V-phase coil groups 13, and an end 15w is an end of the conductive line which is drawn from W-phase coil groups 13.

In each of the ends 15 of the conductive line of each phase which is drawn from each of coil groups 13 by combining the ends 15 of the conductive lines of phases which are different from each other one by one, a pair of conductive line ends (this is referred to as end pairs 15) is provided, and the pair of conductive line ends is connected to each of three connection terminals 30 which are provided on the connector portion 12b.

The connector portion 12b preferably has an approximately L-shaped appearance and is disposed to protrude further toward the outside in the radial direction than the stator core 11 portion. A connection plug which is drawn from a vehicle body side is connected to the connector portion 12b, and current is supplied to each of coil groups 13 of the stator 4 through the connector portion 12b.

Specifically, the connector portion 12b preferably includes a protrusion 21 and a terminal supporting portion 22. The protrusion 21 is preferably continuous with the covering portion 12a which protrudes from one end 15 (which is positioned on the opening side of the case body 5a) in the axial direction of the stator core 11 and extends in a first direction (refer to FIG. 2) which is separated from the rotational axis A. The terminal supporting portion 22 is preferably continuous with the tip of the protrusion 21 and extends in the axial direction along the stator 4. Moreover, a direction which is perpendicular or approximately perpendicular to the first direction shown in FIG. 2 and the axial direction is referred to as a second direction.

Three terminal blocks 23 are juxtaposed with the terminal supporting portion 22, and the connection terminal 30 is preferably installed on each of the terminal blocks 23.

Figure 4:
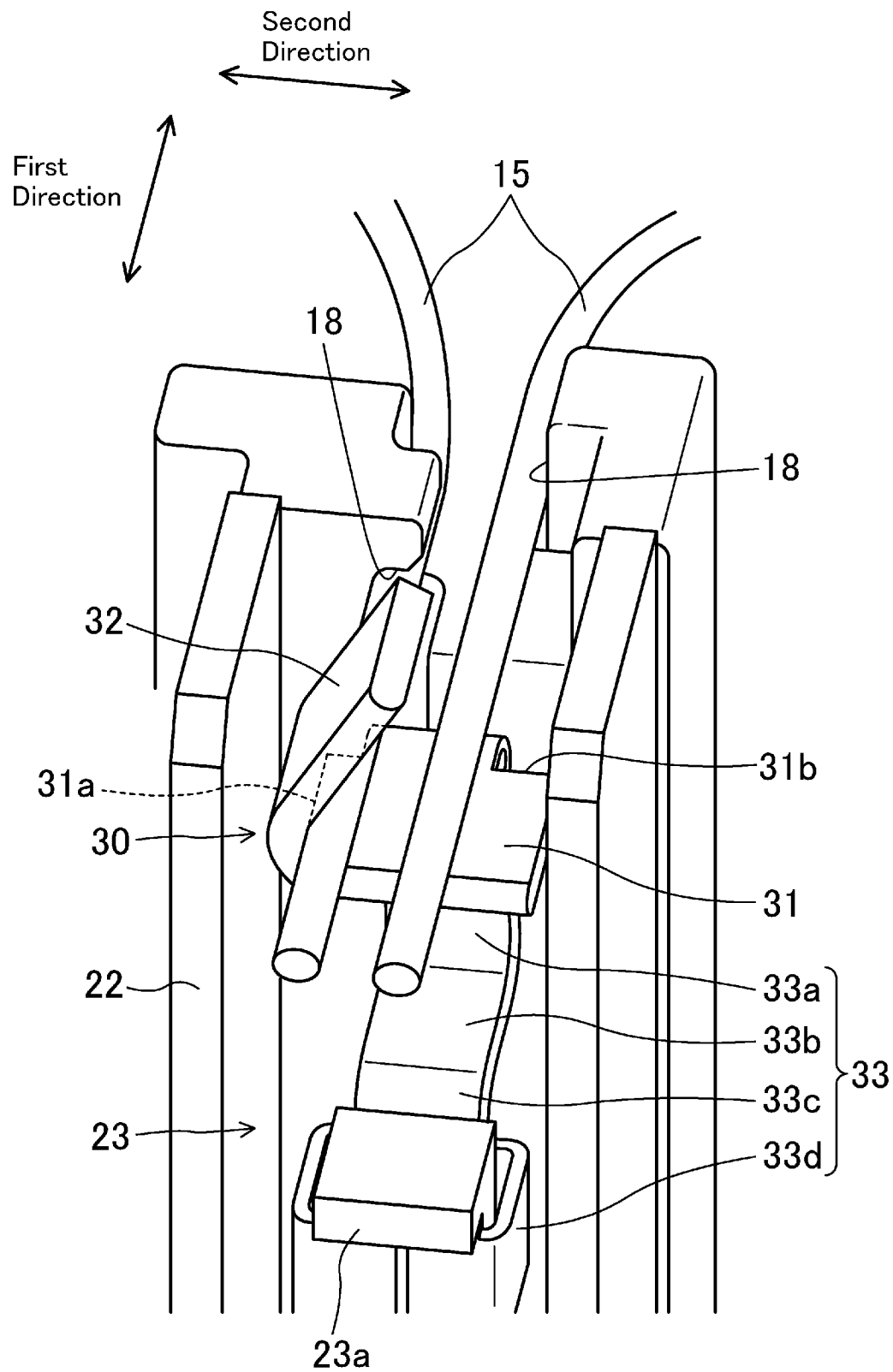
FIG. 4 is an enlarged view of a terminal block portion in accordance with a preferred embodiment of the present invention.

In FIG. 4, the terminal block 23 portion is enlarged and shown. FIG. 4 shows a state before the ends 15 of the conductive line are welded. The connection terminal 30 preferably is, for example, a press-worked product which is formed by bending a metal sheet which is punched out in a predetermined shape. All three connection terminals 30 preferably have the same shape and the same size as one another. The connection terminal 30 preferably includes a base portion 31, a pressing portion 32, and an extending portion 33.

As shown in FIG. 4, the base portion 31 is defined by an approximately rectangular plate shape.

The pressing portion 32 is provided in an approximately rectangular plate shape having the approximately same size as the base portion 31. The pressing portion 32 is preferably provided to be continuous with a side edge 31a of the base portion 31 and arranged so that it can be plastically deformed.

The pressing portion 32 can preferably be bent up to a position overlapping with the base portion 31 in the axial direction. FIG. 4 shows a state before the pressing portion 32 is bent up to the position overlapping the base portion 31 in the axial direction, the pressing portion 32 is bent to the base portion 31 side in advance so as to be easily bent to the base portion 31 side and is inclined to the base portion 31 side.

The extending portion 33 is preferably provided to be continuous with the base portion 31. The extending portion 33 is provided on the one edge (end edge 31b) portion which is perpendicular or approximately perpendicular to the side edge 31a of the base portion 31 on which the pressing portion 32 is provided, and is arranged to extend downward in the axial direction from the end edge 31b.

Specifically, the extending portion 33 is preferably provided in a band plate-shape including a plurality of bent portions, and preferably includes an extending base portion (bent portion) 33a which is continuous with the base portion 31 and which extends in a direction perpendicular or approximately perpendicular to the base portion 31, an extending intermediate portion 33b which is continuous to the tip of the extending base portion 33a and is opposite to the base portion 31, and an extending tip portion 33c which is continuous with the tip of the extending intermediate portion 33b, is approximately perpendicular to the extending intermediate portion 33b, and extends toward a side opposite to the base portion 31.

The connection terminal 30 is preferably assembled into the connector portion 12b so that the extending base portion 33a is positioned back of the terminal block 23. Specifically, in a state where the connection terminal 30 is supported to the connection portion 12b, the extending base portion 33a is preferably disposed so as to be parallel or approximately parallel to the terminal supporting portion 22 and is positioned further toward the center side in the radial direction (first direction) as compared with the pressing portion 32. The base portion 31 extends along the first direction.

A clamping portion 33d having an approximately angled cylindrical shape is preferably provided on the extending tip 33c. The clamping portion 33d is fitted to a mounting portion 23a which is provided on the terminal block 23, and therefore, the connection terminal 30 is assembled into the connector portion 12b.

Moreover, the connection terminal 30 is preferably disposed on the terminal block 23 so that the end pairs 15 are positioned between the base portion 31 and the pressing portion 32 of the connection terminal 30 corresponding to each of the end pairs. Specifically, each of end pairs 15 is drawn so as to extend parallel or approximately parallel in a state of being close to each other from a portion of the stator 4 which preferably has an approximately cylindrical shape toward the outside in the radial direction (first direction).

A guide portion 18 is preferably provided on the upper portion of the covering portion 12a or the upper portion of the connector portion 12b. The guide portion 18 is preferably positioned further toward the center side as compared with the connection terminal 30 and further toward the outside as compared with the coil 13 in the radial direction. The end 15 of the conductive line which is drawn from the coil groups 13 is preferably arranged to be introduced to the connection terminal 30 side by the guide portion 18.

With respect to the end pairs 15 which are drawn in this way, the pressing portion 32 is disposed along the direction (first direction) in which both ends 15 are drawn. Accordingly, the end pairs 15 are disposed between the base portion 31 and the pressing portion 32 in the state of extending in the drawn direction.

After the end pairs 15 are each installed as described above with respect to each corresponding connection terminal 30, each connection terminal 30 and each of the end pairs 15 are preferably bonded by, for example, fusion welding.

Figure 5:
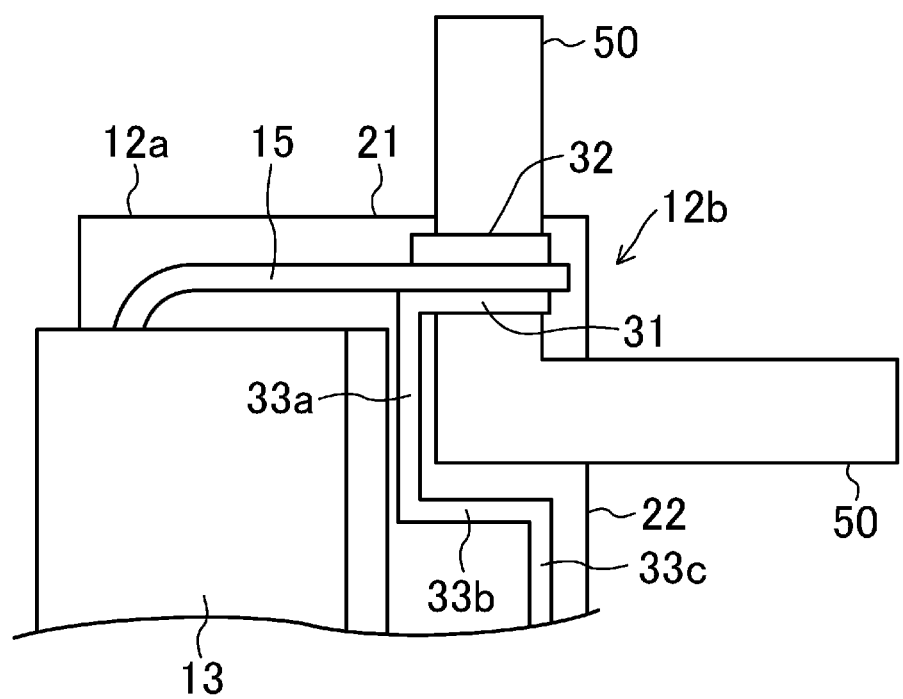
FIG. 5 is a schematic view showing a process at the time of welding in accordance with a preferred embodiment of the present invention.

FIG. 5 shows the process by which the welding is preferably performed. As shown in FIG. 5, the fusion welding is preferably performed by first interposing the base portion 31 and the pressing portion 32 between a pair of electrodes 50 and then by supplying a current between the electrodes 50. As a result, by the resistance heating which is generated in the pressed portion, an insulated coating film which covers the end 15 of the conductive line is welded, and a conductor portion of the end 15 of the exposed conductive line is preferably welded to the base portion 31 or the like.

Figure 6:
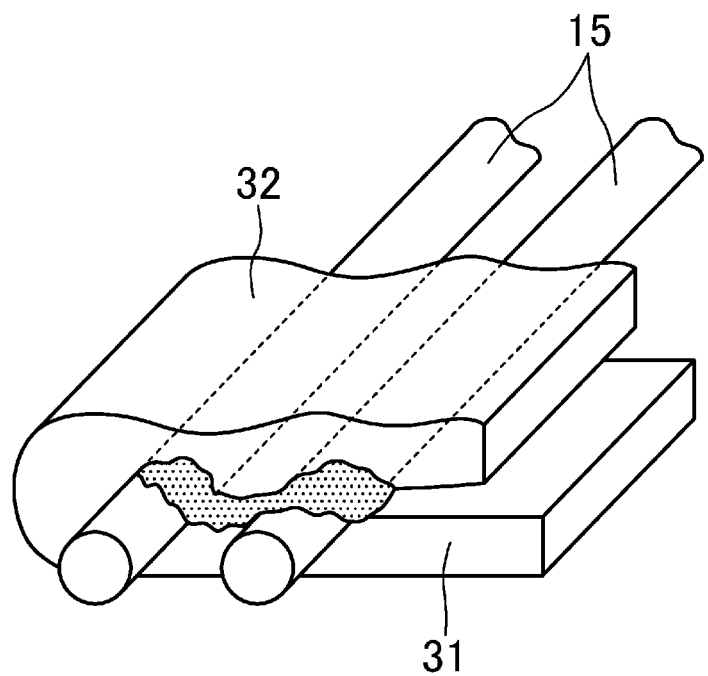
FIG. 6 is a schematic perspective view showing a main portion of a connection terminal in accordance with a preferred embodiment of the present invention.

As a result, as shown in FIG. 6, each connection terminal 30 and each end 15 of the conductive line contact each other and are welded in the state of overlapping with each other in the axial direction. Thereby, the ends 15 of the conductive line of each phase and each connection terminal 30 are electrically connected to each other.

In the case of this connection structure, when the welding is performed, since an external force such as tension does not operate on the ends 15 of the conductive line, the ends 15 of the conductive line and the connection terminal 30 can be welded in a no-load or substantially no-load state. Accordingly, the electric connection which has improved mechanical strength and exerts improved durability to vibration can be realized. When the welding is performed, since the electric connection does not receive influence of the winding process, a diameter of the conductive line can be freely designed, and therefore, there is no limit to the strength of the terminal.

Moreover, since both ends 15 of the conductive lines are interposed between the base portion 31 and the pressing portion 32 and are welded to each other while being held in a linearly extended state, each end 15 of the conductive line preferably contacts the base portion 31 or the like with a wide range. Accordingly, since the resistance heating is evenly distributed and is generated with a wide range, deviation in the welding strength is decreased, and therefore, high quality welding can preferably be stably performed.

Moreover, in the case of the motor 1 of the present preferred embodiment of the present invention, ingenuity for improving miniaturization of the motor is also applied. That is, when the fusion welding is performed, a space into which the electrodes 50 can be inserted needs to be provided in both sides (above and below in FIG. 5, simply referred to as an upper side and a lower side) in the axial direction which the main plane of the base portion 31 faces.

However, if the terminal supporting portion 22 of the connector portion 12b extends in axial direction, since the terminal supporting portion 22 interferes when the electrode 50 of the lower side is inserted, the space arranged to permit inserting the electrode 50 between the outer circumferential portion of the stator 4 and the inner circumferential portion of the terminal supporting portion 22 needs to be secured. As a result, protruding dimensions in the radial direction of the connector portion 12b are easily increased.

On the other hand, in the motor 1 of a preferred embodiment of the present invention, by devising the shape of the terminal, the pressing portion 32 is provided on the side edge 31a of the base portion 31 and the extending base portion 33a is provided on the end edge 31b of the base portion 31. Therefore, the extending base portion 33a (bent portion) can preferably be positioned on the back side of the terminal block 23. As a result, in the state where the connector portion 12b is disposed close to the stator 4 side, the space into which the electrode 50 is inserted to the lower side of the base portion 31 in the radial direction from the outside can be secured such that the inserting of the electrode 50 can be easily performed and the protrusion dimensions in the radial direction of the connector portion 12b are decreased.

In cross-sectional dimensions in the direction perpendicular or substantially perpendicular to the rotational axis A of the base portion 31, a width dimension in the first direction may be larger than the width dimension in the second direction. Moreover, in the state where the pressing portion 32 is bent so as to overlap with the base portion 31 in the axial direction, also in the width dimension of the cross-section in the direction perpendicular or substantially perpendicular to the rotational axis A of the pressing portion 32, the width dimension in the first direction may be larger than the width dimension in the second direction. As a result, since a welding length can be increased, welding strength can be enhanced.

Moreover, if sufficient welding strength can be obtained, cross-sectional shapes of the base portion 31 and the pressing portions 32 in the direction perpendicular or substantially perpendicular to the rotational axis A may not be an approximately rectangular plate shape and may adopt various other desirable shapes such as, for example, a square.

Moreover, the width dimensions of the pressing portion 32 and the base portion 31 may be different from each other. If the sufficient welding strength can be obtained, the width dimension of the pressing portion 32 may be smaller than the width dimension of the base portion 31 or may be larger than that of the base portion 31.

Figure 7:
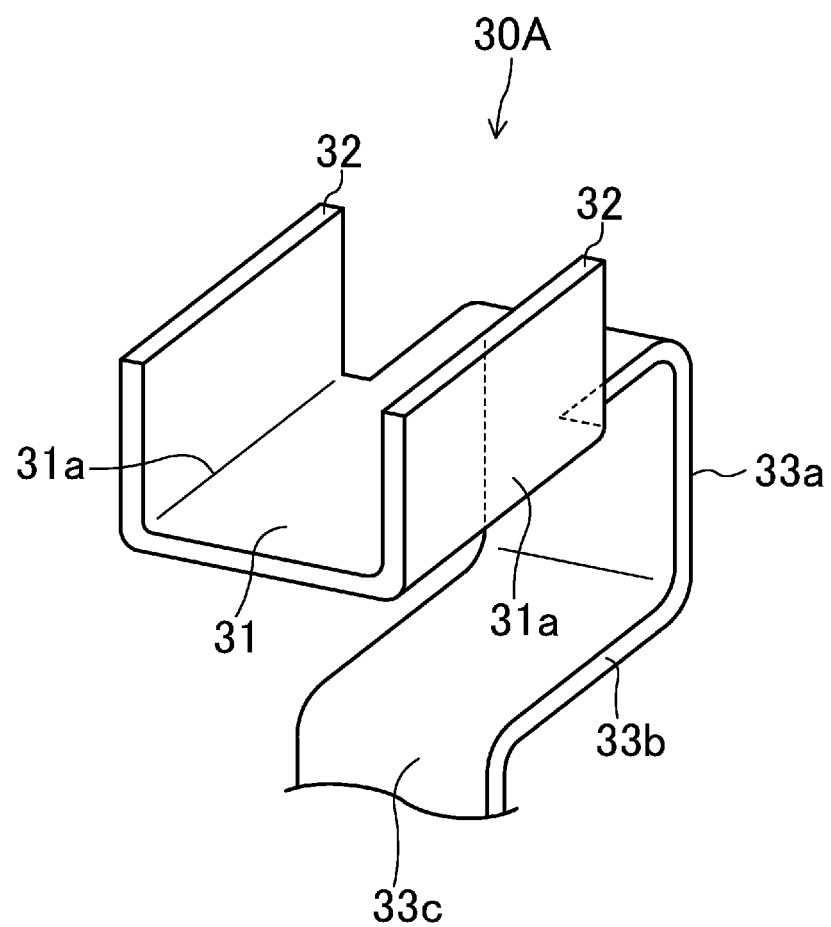
FIG. 7 is a schematic perspective view showing a first modification of the connection terminal in accordance with a preferred embodiment of the present invention.
Figure 8:
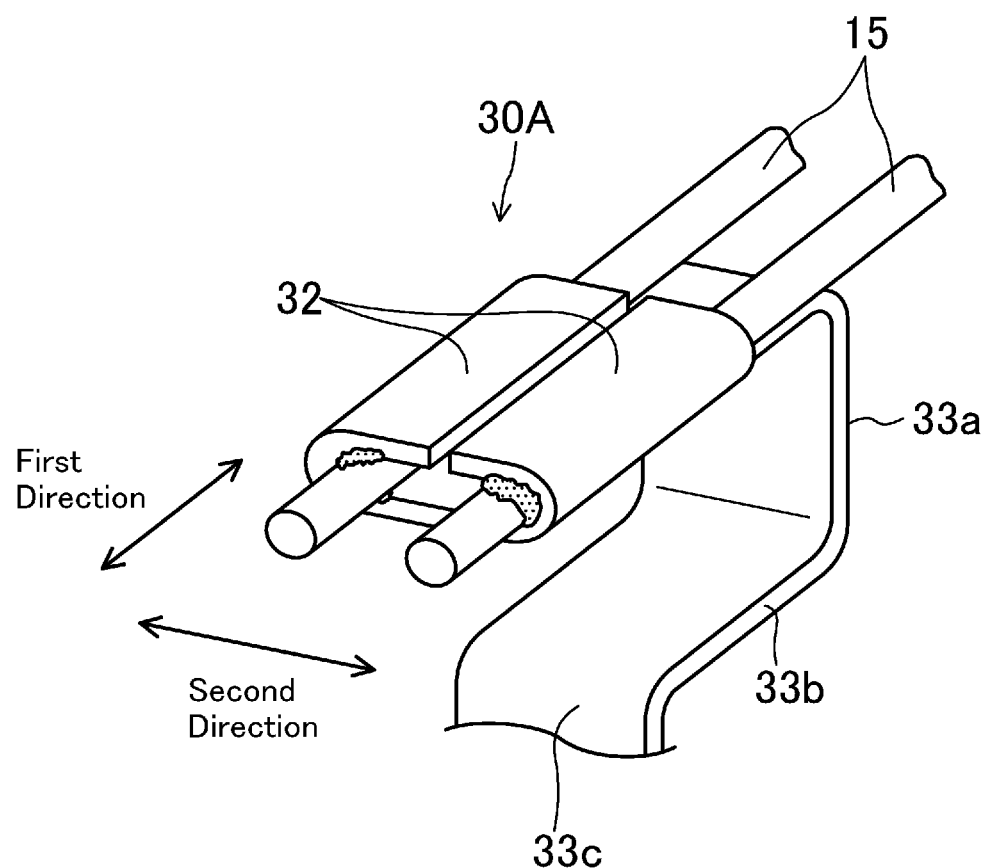
FIG. 8 is a schematic perspective view showing a main portion of the connection terminal in the first modification in accordance with a preferred embodiment of the present invention.

FIGS. 7 and 8 show a modification of the connection terminal 30 in accordance with a preferred embodiment of the present invention. As shown in FIGS. 7 and 8, two pressing portions 32 may be provided. Moreover, also in this case, the width dimension in the first direction of the pressing portion 32 may be larger than the width dimension in the second direction of the base portion 31.

Specifically, as shown in FIG. 7, in the connection terminal 30A of the present preferred embodiment, a pair of pressing portions 32 in which the width dimension in the second direction is approximately half of the base portion 31 is provided so that the pressing portions 32 are opposite to each other in each of both side edges 31a opposite to each other of the base portion 31. In addition, as shown in FIG. 8, the ends 15 of two conductive lines drawn from the coil groups 13 are separately interposed between the pressing portion 32 and the base portion 31 and are welded respectively.

In this case, since each of ends 15 of the conductive lines are preferably welded in a state of being press-bonded by a separated pressing portion 32, when the welding is performed, an effect of a force acting on one welding portion does not easily extend to the other welding portion. As a result, welding having higher quality can be realized, and it is possible to further improve durability.

Figure 9:
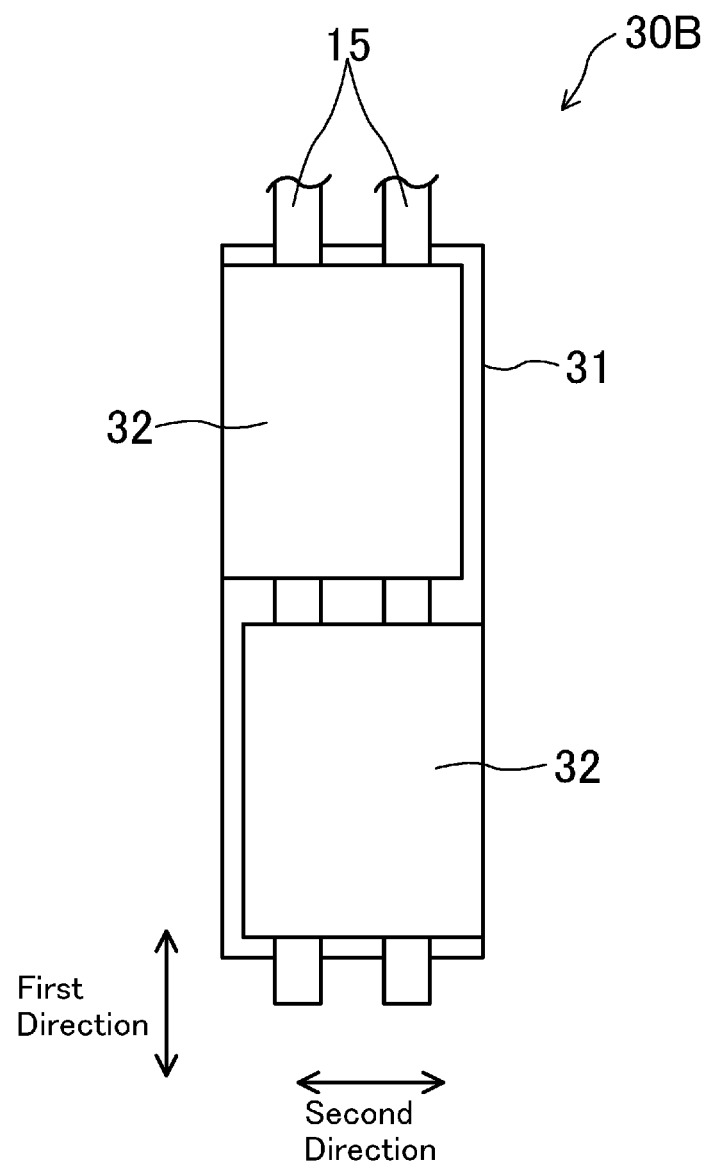
FIG. 9 is a schematic top view showing a second modification of the connection terminal in accordance with a preferred embodiment of the present invention.

FIG. 9 shows another modification of the connection terminal 30 in accordance with a preferred embodiment of the present invention. In a connection terminal 30B of the present modification, two pressing portions 32 are preferably provided on both side edges 31a of the base portion 31 and are disposed so that the positions are shifted to each other in the first direction. Also in the case of the connection terminal 30B, since the welding length is longer, the welding strength can be enhanced.

In the connection terminals 30A and 30B, it is preferable that the width dimension in the first direction of the pressing portion 32 be larger than the width dimension in the second direction of the base portion 31. In that case, since the welding length is longer, the welding strength can be enhanced.

Moreover, the connection structure or the like according to the preferred embodiments of the present invention is not limited to the above-described preferred embodiments and includes other various configurations.

Figure 10:
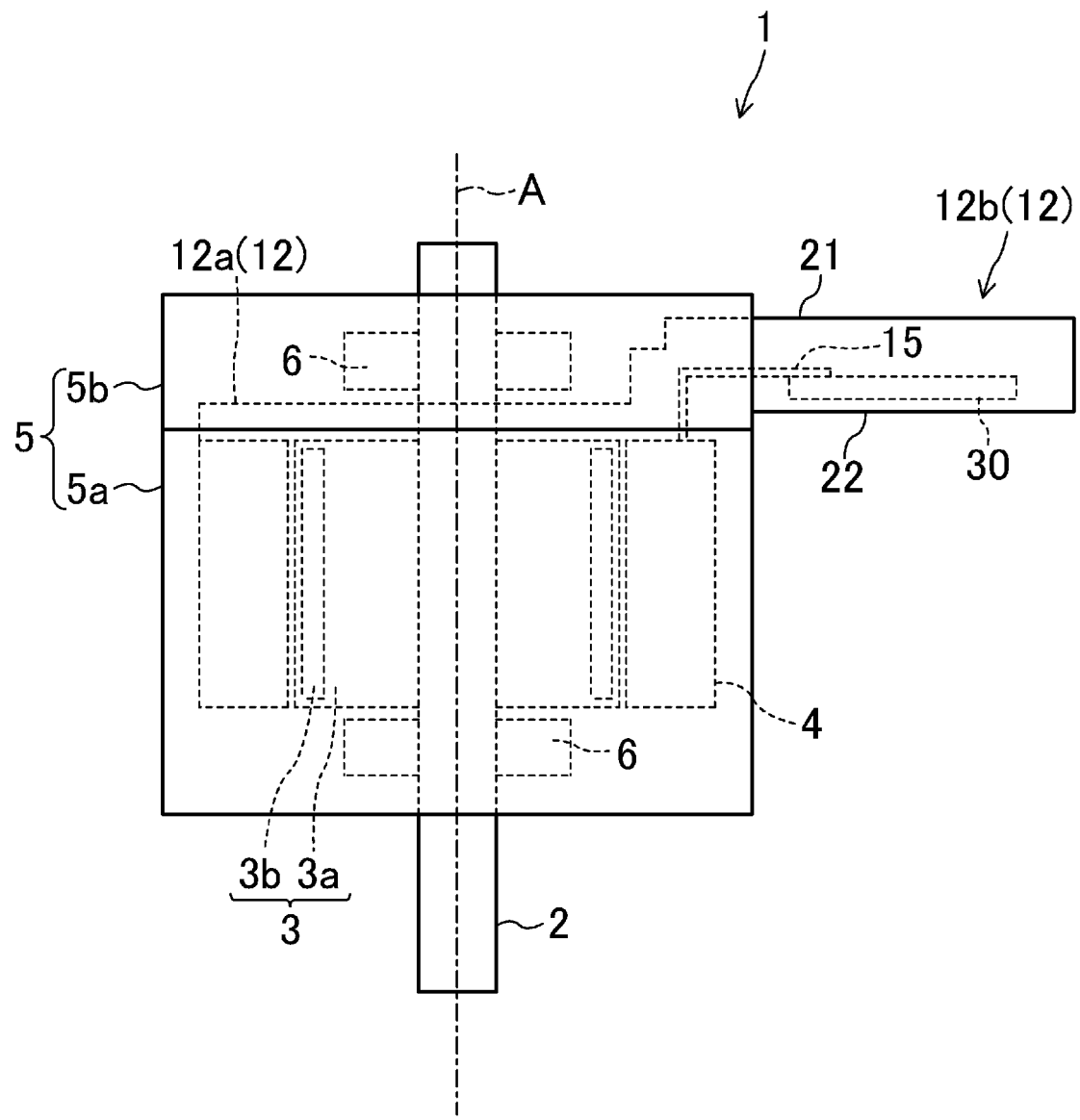
FIG. 10 is a schematic view showing a modification of the motor in accordance with a preferred embodiment of the present invention.

For example, the shape of the connection portion 12b is not limited to the above-described preferred embodiments. As shown in FIG. 10, the connection structure of various preferred embodiments of the present invention may be also applied to the stator 4 or the like in which the connector portion 12b includes the terminal supporting portion 22 extending in the radial direction.

Figure 11:
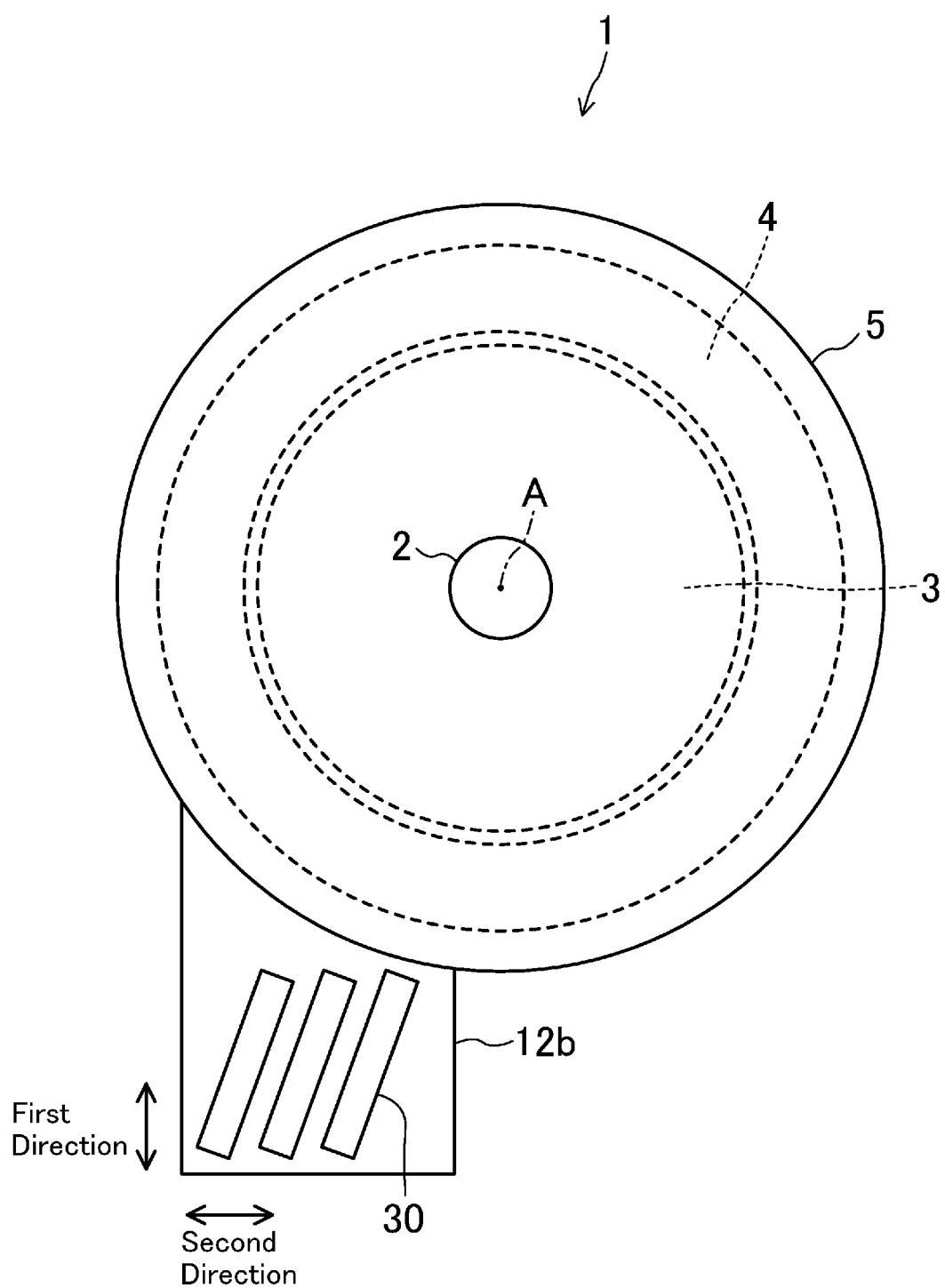
FIG. 11 is a schematic view showing a modification of the motor in accordance with a preferred embodiment of the present invention.

Moreover, as shown in FIG. 11, a disposition of each connection terminal 30 may be appropriately changed in any desirable manner according to any necessary specifications, such as, for example, by being arranged to have an inclination.

Moreover, the connector portion 12b is preferably configured so as to be separated from the insulator 12, and is assembled into the stator 4 or the motor case 5. The winding method of the coil 13 is not limited to the concentrated winding discussed above and may alternatively be, for example, a so-called distributed winding in which the conductive line is wound around the plurality of teeth 11b to define the coil 13.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric motor comprising:
   a rotating portion configured to rotate around a rotational axis; and
   a stationary portion; wherein
   the rotating portion includes a shaft that extends along an axial direction and a rotor that is fixed to the shaft and includes a magnet;
   the stationary portion includes a cover portion, a stator that is fixed to an inner portion of the cover portion in a radial direction and includes a coil, and a connector that is disposed further toward an outside in the radial direction than the stator and includes at least one connection terminal in which at least a portion extends along a first direction which is a direction separated from the rotational axis;
   the connection terminal includes:
     a base portion that extends along the first direction and a pressing portion that is bent in a circumferential direction of the base portion so that a side portion of at least one side among side portions in the circumferential direction overlaps with the base portion in the axial direction;
     at least one bent portion that extends along the axial direction and is provided on an end of an inner portion of the base portion in the radial direction; and
     a clamping portion positioned on a lower axial end of the at least one bent portion; and
   a conductive line which is drawn from the coil is disposed between the base portion and the pressing portion, and the connection terminal and the conductive line contact each other and are welded in a state of overlapping with each other in the axial direction.

2. The motor according to claim 1, wherein a width in the first direction of a cross-section in a direction perpendicular or substantially perpendicular to the rotational axis of the pressing portion is larger than a width in a second direction which is perpendicular or substantially perpendicular to the first direction.

3. The motor according to claim 1, wherein the coil is a three-phase coil.

4. The motor according to claim 3, wherein a wire connection of the coil portion is a delta-connection.

5. The motor according to claim 3, wherein
the pressing portion is provided at two locations in both side portions in the circumferential direction;
the two locations of the pressing portion are opposite to each other in the circumferential direction; and
the conductive lines which are drawn from the coils of two phases among the coils of three phases are disposed between the base portion and each pressing portion one by one, and the connection terminal and the conductive lines are welded together.

6. The motor according to claim 1, wherein a width in the first direction of the pressing portion is larger than a width in a second direction of the base portion which is perpendicular or substantially perpendicular to the first direction.

7. The motor according to claim 1, wherein the pressing portion is provided at two locations in both side portions in the circumferential direction of the base portion, and the two locations of the pressing portion are shifted in the first direction.

8. The motor according to claim 7, wherein a width in the first direction of each pressing portion is larger than a width in a second direction of the base portion which is perpendicular or substantially perpendicular to the first direction.

9. The motor according to claim 1, wherein a guide portion that is disposed outside in the radial direction of the coil and introduces the conductive line drawn from the coil to the connection terminal side is provided on the stator or the connector.

\* \* \* \* \*